(12) United States Patent
Kaneko et al.

(10) Patent No.: US 9,040,625 B2
(45) Date of Patent: May 26, 2015

(54) WATER/OIL REPELLENT COMPOSITION, METHOD FOR ITS PRODUCTION AND ARTICLE

(71) Applicant: ASAHI GLASS COMPANY, LIMITED, Tokyo (JP)

(72) Inventors: Kyouichi Kaneko, Tokyo (JP); Kazunori Sugiyama, Tokyo (JP); Reika Fukuda, Tokyo (JP); Takao Hirono, Toyko (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/062,579

(22) Filed: Oct. 24, 2013

(65) Prior Publication Data

US 2014/0051797 A1 Feb. 20, 2014

Related U.S. Application Data

(63) Continuation of application No. PCT/JP2012/060625, filed on Apr. 19, 2012.

(30) Foreign Application Priority Data

Apr. 27, 2011 (JP) .................................. 2011-099960
Dec. 9, 2011 (JP) .................................. 2011-269960

(51) Int. Cl.
| | | |
|---|---|---|
| *C09D 5/00* | (2006.01) | |
| *C08F 220/22* | (2006.01) | |
| *C08K 5/06* | (2006.01) | |
| *C08K 5/20* | (2006.01) | |
| *C08F 214/06* | (2006.01) | |
| *C08F 214/18* | (2006.01) | |
| *D06M 15/248* | (2006.01) | |
| *D06M 15/263* | (2006.01) | |
| *D06M 15/277* | (2006.01) | |
| *D06M 15/273* | (2006.01) | |
| *D06M 15/356* | (2006.01) | |

(52) U.S. Cl.
CPC ............... *C09D 5/00* (2013.01); *C08F 220/22* (2013.01); *C08K 5/06* (2013.01); *C08K 5/20* (2013.01); *C08F 214/06* (2013.01); *C08F 214/18* (2013.01); *D06M 15/248* (2013.01); *D06M 15/263* (2013.01); *D06M 15/277* (2013.01); *D06M 2200/11* (2013.01); *D06M 2200/12* (2013.01); *C08F 214/182* (2013.01); *C08F 214/184* (2013.01); *D06M 15/273* (2013.01); *D06M 15/3562* (2013.01); *D06M 15/3564* (2013.01)

(58) Field of Classification Search
CPC ........... C09D 5/00; C08F 220/22; C08F 2/32; C08F 16/24; C08K 5/06
USPC ................. 524/726, 755, 765, 773, 801, 544; 526/247
See application file for complete search history.

(56) References Cited

U.S. PATENT DOCUMENTS

| | | | |
|---|---|---|---|
| 8,193,277 B2 | 6/2012 | Otozawa et al. | |
| 2012/0097882 A1 | 4/2012 | Otozawa et al. | |

FOREIGN PATENT DOCUMENTS

| | | | |
|---|---|---|---|
| EP | 1298180 A1 * | 4/2003 | |
| EP | 2204429 | 7/2010 | |
| JP | 10-273879 A | 10/1998 | |
| JP | 2004-250353 A | 9/2004 | |
| JP | 2009-185079 A | 8/2009 | |
| JP | 2010100766 A * | 5/2010 | |
| WO | WO-2006/075373 A1 | 7/2006 | |
| WO | WO-2008/022985 A1 | 2/2008 | |
| WO | WO-2010/123042 A1 | 10/2010 | |
| WO | WO-2010/140668 A1 | 12/2010 | |

OTHER PUBLICATIONS

International Preliminary Report received in PCT/JP2012/060625 dated Nov. 7, 2013.
International Search Report received in PCT/JP2012/060625 dated Jul. 24, 2012.
Extended European Search Report issued in Application No. 12777818.1 dated Oct. 17, 2014.
Supplemental Extended European Search Report issued in Application No. 12776976.8.

* cited by examiner

*Primary Examiner* — Michael M Bernshteyn
(74) *Attorney, Agent, or Firm* — Foley & Lardner LLP

(57) ABSTRACT

To provide a water/oil repellent composition which can impart sufficient post-air-drying water/oil repellency to the surface of an article, and which presents a low environmental impact, and an article having its surface treated with the water/oil repellent composition. A water/oil repellent composition comprising a copolymer (A) having structural units based on a monomer (a), structural units based on a monomer (b), structural units based on a monomer (c) and/or structural units based on a monomer (d); and an aqueous medium (B) containing water, and a film-forming assistant (x) and/or a film-forming assistant (y). Monomer (a): a monomer having a $C_{1-6}$ polyfluoroalkyl group, monomer (b): vinylidene chloride, monomer (c): a monomer, the homopolymer of which has a glass transition temperature of at least 20° C., monomer (d): a monomer having a crosslinkable functional group, film-forming assistant (x): a specific amide solvent, and film-forming assistant (y): a specific glycol solvent.

8 Claims, No Drawings

WATER/OIL REPELLENT COMPOSITION, METHOD FOR ITS PRODUCTION AND ARTICLE

TECHNICAL FIELD

The present invention relates to a water/oil repellent composition, a method for its production and an article having its surface treated with the water/oil repellent composition.

BACKGROUND ART

As a method for imparting water/oil repellency to the surface of an article (such as a fiber product), a method of dipping the article in a water/oil repellent composition composed of an emulsion having, dispersed in an aqueous medium, a copolymer having structural units based on a monomer having a polyfluoroalkyl group (hereinafter referred to as a $R^f$ group) and drying the article has been known.

In recent years, in view of the improvement in work environment and the energy saving, an article dipped in a water/oil repellent composition is required to be dried at room temperature (hereinafter drying at room temperature will be referred to as air-drying) in some cases. However, in a case where an article dipped in a water/oil repellent composition is air-dried, the article will be insufficient in the water/oil repellency (hereinafter the water/oil repellency of an article in the case of air-drying will be referred to as post-air-drying water/oil repellency).

As a water/oil repellent composition which can impart post-air-drying water/oil repellency to the surface of an article, for example, the following water/oil repellent composition has been proposed.

A water/oil repellent composition comprising a copolymer (A) having (I) structural units based on a monomer having an $R^f$ group, (II) structural units based on a monomer having a urethane or urea bond, (III) structural units based on a monomer, the homopolymer of which has a glass transition temperature of at most 50° C., (IV) structural units based on a monomer having a hydrophilic group and (V) structural units based on a monomer having a chlorine atom, and a film-forming assistant (B), dispersed in an aqueous medium (Patent Document 1).

By the way, recently, EPA (US Environmental Protection Agency) has pointed out that a compound having a perfluoroalkyl group (a perfluoroalkyl group will be hereinafter referred to as a $R^F$ group) having at least 7 carbon atoms is likely to be decomposed in the environment or in the body, and the decomposition product is likely to be accumulated, i.e. it presents a high environmental impact. Therefore, a water/oil repellent composition comprising a copolymer which has structural units based on a monomer having a $R^F$ group having at most 6 carbon atoms, and has no structural units based on a monomer having a $R^F$ group having at least 7 carbon atoms, has been required.

However, in the water/oil repellent composition as disclosed in Patent Document 1, if the number of carbon atoms in the $R^f$ group of the monomer in (I) is at most 6, the post-air-drying water/oil repellency of the article is insufficient.

PRIOR ART DOCUMENTS

Patent Documents

Patent Document 1: JP-A-10-273879

DISCLOSURE OF INVENTION

Technical Problems

The object of the present invention is to provide a water/oil repellent composition which can impart sufficient water/oil repellency to the surface of an article and which presents a low environmental impact, its production method and an article having its surface treated with the water/oil repellent composition.

Solution to Problem

The water/oil repellent composition of the present invention comprises a copolymer (A) and an aqueous medium (B), wherein the copolymer (A) has structural units based on the following monomer (a), structural units based on the following monomer (b), and at least one type of structural units selected from structural units based on the following monomer (c) and structural units based on the following monomer (d); and the aqueous medium (B) contains water and at least one film-forming assistant selected from the following film-forming assistant (x) and the following film-forming assistant (y):

monomer (a): a compound represented by the following formula (1):

$$(Z-Y)_n X \tag{1}$$

wherein Z is a $C_{1-6}$ polyfluoroalkyl group or a group represented by the following formula (2), Y is a bivalent organic group having no fluorine atom, or a single bond, n is 1 or 2, and X is, when n is 1, any one of the groups represented by the following formulae (3-1) to (3-5) and, when n is 2, any one of the groups represented by the following formulae (4-1) to (4-4):

$$C_iF_{2i+1}O(CFX^1CF_2O)_jCFX^2— \tag{2}$$

wherein i is an integer of from 1 to 6, j is an integer of from 0 to 10, and each of $X^1$ and $X^2$ is a fluorine atom or a trifluoromethyl group;

$$—CR=CH_2 \tag{3-1}$$

$$—C(O)OCR=CH_2 \tag{3-2}$$

$$—OC(O)CR=CH_2 \tag{3-3}$$

$$—OCH_2\text{-}\phi\text{-}CR=CH_2 \tag{3-4}$$

$$—OCH=CH_2 \tag{3-5}$$

wherein R is a hydrogen atom, a methyl group or a halogen atom, and $\phi$ is a phenylene group;

$$—CH[—(CH_2)_m CR=CH_2]— \tag{4-1}$$

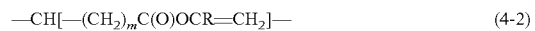

$$—CH[—(CH_2)_m C(O)OCR=CH_2]— \tag{4-2}$$

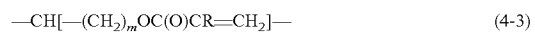

$$—CH[—(CH_2)_m OC(O)CR=CH_2]— \tag{4-3}$$

$$—OC(O)CH=CHC(O)O— \tag{4-4}$$

where R is a hydrogen atom, a methyl group or a halogen atom, and m is an integer of from 0 to 4;

monomer (b): vinylidene chloride;

monomer (c): a monomer having no polyfluoroalkyl group nor crosslinkable functional group, the homopolymer of which has a glass transition temperature of at least 20° C.;

monomer (d): a monomer having no polyfluoroalkyl group and having a crosslinkable functional group;

film-forming assistant (x): a compound represented by the following formula (5):

$$R^1O(CH_2)_r(CHR^4)_sC(O)NR^2R^3 \quad (5)$$

wherein r is an integer of from 0 to 3, s is 0 or 1, $R^1$ is a $C_{1-4}$ alkyl group, each of $R^2$ and $R^3$ which are independent of each other, is a $C_{1-3}$ alkyl group (provided that it may contain an etheric oxygen atom), and $R^4$ is a hydrogen atom or a methyl group;

film-forming assistant (y): a compound represented by the following formula (6):

$$R^5-O-(CH_2CH_2O)_t-R^6 \quad (6)$$

wherein t is 3 or 4, each of $R^5$ and $R^6$ which are independent of each other, is a $C_{1-4}$ alkyl group.

The copolymer (A) preferably has structural units based on the monomer (a), structural units based on the monomer (b), structural units based on the monomer (c) and structural units based on the monomer (d).

The monomer (a) is preferably a monomer of the formula (1) wherein Z is a $C_{4-6}$ perfluoroalkyl group, Y is a $C_{1-4}$ alkylene group, n is 1, and X is the group (3-3) (provided that R is a hydrogen atom or a methyl group).

The monomer (c) is preferably an acrylate or a methacrylate having a cycloalkyl group or a $C_{16-25}$ alkyl group. Further, the crosslinkable functional group in the monomer (d) is preferably a hydroxy group, a blocked isocyanate group, an amino group or an epoxy group.

The film-forming assistant (x) is preferably 3-alkoxy-N,N-dialkylpropionamide, and the film-forming assistant (y) is preferably triethylene glycol dimethyl ether or tetraethylene glycol dimethyl ether.

The total proportion of the film-forming assistant (x) and the film-forming assistant (y) is preferably from 0.1 to 20 mass % in the aqueous medium (B) (100 mass %).

The total amount of the film-forming assistant (x) and the film-forming assistant (y) is preferably from 10 to 4,000 parts by mass per 100 parts by mass of the copolymer (A).

The water/oil repellent composition of the present invention is preferably an emulsion obtained by blending at least one of the film-forming assistant (x) and the film-forming assistant (y) with an emulsion obtained by polymerizing the monomers by emulsion polymerization in an aqueous medium.

The method for producing the water/oil repellent composition of the present invention comprises polymerizing the monomers in an aqueous medium in the presence of a surfactant and a polymerization initiator to produce an emulsion of the copolymer (A), and blending at least one film-forming assistant selected from the film-forming assistant (x) and the film-forming assistant (y) with the obtained emulsion.

Further, the method for producing the water/oil repellent composition of the present invention comprises polymerizing the monomers in an aqueous medium containing at least one film-forming assistant selected from the film-forming assistant (x) and the film-forming assistant (y), in the presence of a surfactant and a polymerization initiator to produce an emulsion of the copolymer (A).

The article of the present invention is an article having its surface treated with the water/oil repellent composition of the present invention thereby having a coating film of the copolymer (A) on its surface.

Advantageous Effects of Invention

The water/oil repellent composition of the present invention can impart sufficient post-air-drying water/oil repellency to the surface of an article, and presents a low environmental impact.

The article of the present invention has sufficient post-air-drying water/oil repellency and presents a low environmental impact.

DESCRIPTION OF EMBODIMENTS

In this specification, a compound represented by the formula (1) will be referred to as a compound (1). Compounds represented by other formulae will also be referred to in the same manner. Further, in this specification, a group represented by the formula (2) will be referred to as a group (2). Groups represented by other formulae will also be referred to in the same manner.

Further, a (meth)acrylate in this specification means an acrylate or a methacrylate.

Further, in this specification, a monomer means a compound having a polymerizable unsaturated group.

Further, in this specification, a $R^f$ group is a group having some or all of hydrogen atoms in an alkyl group substituted by fluorine atoms.

Further, in this specification, a $R^F$ group is a group having all the hydrogen atoms in an alkyl group substituted by fluorine atoms.

<Water/Oil Repellent Composition>

The water/oil repellent composition of the present invention comprises a specific copolymer (A) and a specific aqueous medium (B) as essential components, and may further contain a surfactant or an additive, as the case requires. The water/oil repellent composition of the present invention is preferably an emulsion in which fine particles of the copolymer (A) are stably dispersed in the aqueous medium (B), and usually contains a surfactant for the stable dispersion.

(Copolymer (A))

The copolymer (A) has structural units based on the following monomer (a), structural units based on the following monomer (b), and either one or both of structural units based on the monomer (c) and structural units based on the monomer (d).

The copolymer (A) preferably has, from the viewpoint of the post-air-drying water/oil repellency and dynamic water repellency (heavy rain water repellency), structural units based on the monomer (a), structural units based on the monomer (b), structural units based on the monomer (c) and structural units based on the monomer (d).

The copolymer (A) may have structural units based on a monomer (e) other than the monomers (a) to (d).

Monomer (a):

The monomer (a) is a compound (I):

$$(Z-Y)_nX \quad (1)$$

By having structural units based on the monomer (a), water/oil repellency can be imparted to an article.

Z is a $C_{1-6}R^f$ group (provided that the $R^f$ group may contain an etheric oxygen atom) or a group (2):

$$C_iF_{2i+1}O(CFX^1CF_2O)_jCFX^2- \quad (2)$$

wherein i is an integer of from 1 to 6, j is an integer of from 0 to 10, and each of $X^1$ and $X^2$ which are independent of each other, is a fluorine atom or a trifluoromethyl group.

Z is preferably a $C_{4-6}R^f$ group, more preferably a $C_6R^f$ group.

The $R^f$ group is preferably a $R^F$ group. The $R^f$ group may be linear or branched, and is preferably linear. The number of carbon atoms in the $R^f$ group is preferably from 4 to 6.

Z may, for example, be the following groups:

$F(CF_2)_4-$,
$F(CF_2)_5-$,

F(CF$_2$)$_6$—,
(CF$_3$)$_2$CF(CF$_2$)$_2$—,
C$_k$F$_{2k+1}$O[CF(CF$_3$)CF$_2$O]$_h$—CF(CF$_3$)—, etc.
wherein k is an integer of from 1 to 6, and h is an integer of from 0 to 10.

Y is a bivalent organic group having no fluorine atom or a single bond.

The bivalent organic group is preferably an alkylene group. The alkylene group may be linear or branched. The number of carbon atoms in the alkylene group is preferably from 2 to 6. The bivalent organic group may have —O—, —NH—, —CO—, —S—, —SO$_2$—, —CD$^1$=CD$^2$- (wherein each of D$^1$ and D$^2$ which are independent of each other, is a hydrogen atom or a methyl group), etc.

Y may, for example, be the following groups.
—CH$_2$—,
—CH$_2$CH$_2$—,
—(CH$_2$)$_3$—,
—CH$_2$CH$_2$CH(CH$_3$)—,
—CH=CH—CH$_2$—,
—S—CH$_2$CH$_2$—,
—CH$_2$CH$_2$—S—CH$_2$CH$_2$—,
—CH$_2$CH$_2$—SO$_2$—CH$_2$CH$_2$—,
—W—OC(O)NH-A-NHC(O)O—(C$_p$H$_{2p}$)—, etc.
wherein p is an integer of from 2 to 30.

A is a symmetric alkylene group having no branch, an arylene group or an aralkylene group and is preferably —C$_6$H$_{12}$—, -φ-CH$_2$-φ- or -φ- (wherein φ is a phenylene group).

W is any one of the following groups.
—SO$_2$N(R$^7$)—C$_d$H$_{2d}$—,
—CONHC$_d$H$_{2d}$—,
—CH(R$^{F1}$)—C$_e$H$_{2e}$—,
—C$_q$H$_{2q}$—
wherein R$^7$ is a hydrogen atom or a C$_{1-4}$ alkyl group, d is an integer of from 2 to 8, R$^{F1}$ is a C$_{1-6}$ perfluoroalkyl group, e is an integer of from 0 to 6, and q is an integer of from 1 to 20. R$^{F1}$ is preferably a C$_4$ or C$_6$ perfluoroalkyl group.

n is 1 or 2.

X is, when n is 1, any one of groups (3-1) to (3-5) and when n is 2, any one of groups (4-1) to (4-4):

—CR=CH$_2$  (3-1)

—C(O)OCR=CH$_2$  (3-2)

—OC(O)CR=CH$_2$  (3-3)

—OCH$_2$-φ-CR=CH$_2$  (3-4)

—OCH=CH$_2$  (3-5)

wherein R is a hydrogen atom, a methyl group or a halogen atom, and φ is a phenylene group.

—CH[—(CH$_2$)$_m$CR=CH$_2$]—  (4-1)

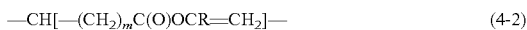
—CH[—(CH$_2$)$_m$C(O)OCR=CH$_2$]—  (4-2)

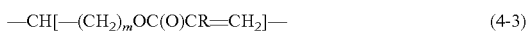
—CH[—(CH$_2$)$_m$OC(O)CR=CH$_2$]—  (4-3)

—OC(O)CH=CHC(O)O—  (4-4)

wherein R is a hydrogen atom, a methyl group or a halogen atom, and m is an integer of from 0 to 4.

The above Z is preferably a R$^F$ group, Y is preferably an alkylene group, and n is preferably 1. In such a case, X is preferably any of the groups (3-3) to (3-5), more preferably the group (3-3). Further, the above R is preferably a hydrogen atom or a methyl group.

The compound (1) is preferably a (meth)acrylate having a C$_{4-6}$R$^F$ group from the viewpoint of e.g. the polymerizability with other monomers, the flexibility of the coating film containing the copolymer (A), the adhesion of the copolymer (A) to an article, the dispersibility in an aqueous medium and efficiency of the emulsion polymerization.

The compound (1) is particularly preferably a compound wherein Z is a C$_{4-6}$R$^F$ group, Y is a C$_{1-4}$ alkylene group, n is 1, and X is the group (3-3) (provided that R is a hydrogen atom or a methyl group).

Monomer (b):

The monomer (b) is vinylidene chloride.

By having structural units based on the monomer (b), the affinity of the copolymer (A) to an article and the film-forming property are improved. Therefore, even when an article dipped in the water/oil repellent composition is air-dried, the copolymer (A) will infiltrate even into a portion where a coating film of the copolymer (A) is hardly formed, such as a portion between fibers in an article (such as a fiber product), in every hole and corner, and a uniform and ideal coating film of the copolymer (A) can be formed. As a result, sufficient post-air-drying water/oil repellency can be imparted to an article.

Monomer (c):

The monomer (c) is a monomer having no R$^f$ group nor crosslinkable functional group as described hereinafter, the homopolymer of which has a glass transition temperature (hereinafter referred to as Tg) of at least 20° C.

By having structural units based on the monomer (c), the post-air-drying water/oil repellency can be improved and at the same time, dynamic water repellency (heavy rain water repellency) can be imparted to an article.

Vinyl chloride which is one type of the monomer (c) is one type of a chlorinated olefin like vinylidene chloride as the monomer (b), and structural units based on vinyl chloride impart to the copolymer (A) the same properties as the structural units based on the monomer (b). Accordingly, by the copolymer (A) having the structural units based on the monomer (b), the copolymer (A) further having the structural units based on vinyl chloride is not necessary so much. Accordingly, even when the copolymer (A) has structural units based on vinyl chloride, the content of the structural units based on vinyl chloride in the copolymer (A) is preferably at most 40 mass % based on the total amount of the structural units based on vinyl chloride and the structural units based on the monomer (b). More preferably, the copolymer (A) is a copolymer having substantially no structural units based on vinyl chloride.

Tg of the homopolymer of the monomer (c) is preferably at least 22° C., more preferably at least 40° C., further preferably at least 60° C., particularly preferably at least 100° C. Further, the upper limit of Tg if preferably 200° C.

Tg of the homopolymer of the monomer (c) is the midpoint glass transition temperature measured by a differential scanning calorimetry (DSC) method in accordance with JIS K7121:1987.

The monomer (c) may, for example, be the following compounds.

Methyl methacrylate (Tg: 105° C.), ethyl methacrylate (Tg: 65° C.), n-propyl methacrylate (Tg: 33° C.), isopropyl methacrylate (Tg: 81° C.), n-butyl methacrylate (Tg: 20° C.), isobutyl methacrylate (Tg: 48° C.), t-butyl acrylate (Tg: 41° C.), t-butyl methacrylate (Tg: 107° C.), cetyl methacrylate (Tg: 23.5° C.), cetyl acrylate (Tg: 34° C.), stearyl methacrylate (Tg: 35° C.), stearyl acrylate (Tg: 47° C.), behenyl methacrylate (Tg: 55° C.), behenyl acrylate (Tg: 66° C.), isobornyl acrylate (Tg: 90° C.), isobornyl methacrylate (Tg: 180° C.), styrene (Tg: 100° C.), vinyl chloride (Tg: 82° C.), benzyl methacrylate (Tg: 55° C.), cyclohexyl methacrylate (Tg: 66° C.), tetrahydrofuryl methacrylate (Tg: 60° C.), phenoxyethyl methacrylate (Tg: 36° C.), cyclopentanyl methacrylate (Tg: 175° C.), cyclopentanyl acrylate (Tg: 120° C.) and cyclopentenyloxyethyl methacrylate (Tg: 45° C.).

The monomer (c) is, from the viewpoint of the post-air-drying water/oil repellency and the dynamic water repellency (heavy rain water repellency), preferably a (meth)acrylate having a cycloalkyl group or a $C_{16-25}$ alkyl group, specifically, preferably stearyl acrylate, behenyl acrylate, behenyl methacrylate, isobornyl acrylate, isobornyl methacrylate or the like.

Monomer (d):

The monomer (d) is a monomer having no $R^f$ group and having a crosslinkable functional group.

By having the structural units based on the monomer (d), the post-air-drying water/oil repellency can be imparted and at the same time, dynamic water repellency (heavy rain water repellency) can be imparted to an article.

The crosslinkable functional group is preferably a functional group having at least one bond selected from a covalent bond, an ionic bond and a hydrogen bond, or a functional group capable of forming a crosslinked structure by an interaction of such a bond. Otherwise, a compound having an active organic group or an element such as hydrogen or halogen in its molecule may be used.

Such a functional group is preferably a hydroxy group, an isocyanate group, a blocked isocyanate group, an alkoxysilyl group, an amino group, a N-alkoxymethylamide group, a silanol group, an ammonium group, an amide group, an epoxy group, an oxazoline group, a carboxy group, an alkenyl group, a sulfonic group or the like, particularly preferably a hydroxy group, a blocked isocyanate group, an amino group or an epoxy group.

The monomer (d) is preferably a (meth)acrylate, an acrylamide, a vinyl ether or a vinyl ester.

The monomer (d) may, for example, be the following compounds.

2-Isocyanatoethyl (meth)acrylate, 3-isocyanatopropyl (meth)acrylate, 4-isocyanatobutyl (meth)acrylate, a 2-butanoneoxime adduct of 2-isocyanatoethyl (meth)acrylate, a pyrazole adduct of 2-isocyanatoethyl (meth)acrylate, a 3,5-dimethylpyrazole adduct of 2-isocyanatoethyl (meth)acrylate, a 3-methylpyrazole adduct of 2-isocyanatoethyl (meth)acrylate, an ε-caprolactam adduct of 2-isocyanatoethyl (meth)acrylate, a 2-butanoneoxime adduct of 3-isocyanatopropyl (meth)acrylate, a pyrazole adduct of 3-isocyanatopropyl (meth)acrylate, a 3,5-dimethylpyrazole adduct of 3-isocyanatopropyl (meth)acrylate, a 3-methylpyrazole adduct of 3-isocyanatopropyl (meth)acrylate, an ε-caprolactam adduct of 3-isocyanatopropyl (meth)acrylate, a 2-butanoneoxime adduct of 4-isocyanatobutyl (meth)acrylate, a pyrazole adduct of 4-isocyanatobutyl (meth)acrylate, a 3,5-dimethylpyrazole adduct of 4-isocyanatobutyl (meth)acrylate, a 3-methylpyrazole adduct of 4-isocyanatobutyl (meth)acrylate, an ε-caprolactam adduct of 4-isocyanatobutyl (meth) acrylate.

Methoxymethyl (meth)acrylamide, ethoxymethyl (meth) acrylamide, butoxymethyl (meth)acrylamide, diacetone (meth)acrylamide, γ-methacryloyloxypropyl trimethoxysilane, trimethoxy vinyl silane, vinyl trimethoxysilane, dimethylaminoethyl (meth)acrylate, diethylaminoethyl (meth) acrylate, dimethylaminopropyl (meth)acrylate, (meth) acryloylmorpholine, (meth)acryloyloxyethyl trimethylammonium chloride, (meth)acryloyloxypropyl trimethylammonium chloride, (meth)acrylamideethyl trimethylammonium chloride, (meth)acrylamidepropyl trimethylammonium chloride.

t-butyl (meth)acrylamide sulfonic acid, (meth)acrylamide, N-methyl (meth)acrylamide, N-methylol (meth)acrylamide, N-butoxymethyl (meth)acrylamide, glycidyl (meth)acrylate, 2-hydroxyethyl (meth)acrylate, 2-hydroxypropyl (meth) acrylate, 4-hydroxybutyl (meth)acrylate, 3-chloro-2-hydroxypropyl methacrylate, polyoxyalkylene glycol mono (meth) acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth)acrylate, 2-vinyl-2-oxazoline, a polycaprolactone ester of 2-vinyl-4-methyl-(2-vinyloxazoline)hydroxyethyl (meth)acrylate.

Tri (meth)allyl isocyanurate (T(M)AIC manufactured by Nippon Kasei Chemical Co., Ltd.), triallyl cyanurate (TAC manufactured by Nippon Kasei Chemical Co., Ltd.), phenyl glycidyl ether acrylate toluene diisocyanate urethane prepolymer (AT-600 manufactured by KYOEISHA CHEMICAL Co., Ltd.), 3-(methylethylketoxime)isocyanatomethyl-3,5,5-trimethylcyclohexyl(2-hydroxyethyl methacrylate) cyanate (TECHCOAT HE-6P manufactured by Kyoken Kasei), a polycaprolactone ester of hydroxyethyl (meth)acrylate (PLACCEL FA, FM series manufactured by Daicel Chemical Industries, Ltd.).

2-Chloroethyl vinyl ether, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 4-hydroxycyclohexyl vinyl ether, hexamethylene glycol monovinyl ether, 1,4-cyclohexanedimethanol monovinyl ether, diethylene glycol monovinyl ether, triethylene glycol monovinyl ether, dipropylene glycol monovinyl ether, glycidyl vinyl ether, 2-aminoethyl vinyl ether, 3-aminopropyl vinyl ether, 2-aminobutyl vinyl ether, allyl vinyl ether, 1,4-butanediol divinyl ether, nonanediol divinyl ether, cyclohexanediol divinyl ether, cyclohexanedimethanol divinyl ether, triethylene glycol divinyl ether, trimethylolpropane trivinyl ether, pentaerythritol tetravinyl ether.

The monomer (d) is, from the viewpoint of the post-air-drying water/oil repellency and the dynamic water repellency (heavy rain water repellency), preferably a 3,5-dimethylpyrazole adduct of 2-isocyanatoethyl (meth)acrylate, a 2-butanoneoxime adduct of 2-isocyanatoethyl (meth)acrylate, 2-hydroxyethyl (meth)acrylate, N-methylol (meth)acrylamide, glycidyl (meth)acrylate, 3-chloro-2-hydroxypropyl methacrylate, a polycaprolactone ester of hydroxyethyl (meth)acrylate (PLACCEL FA or FM-series manufactured by Daicel Chemical Industries, Ltd.).

Monomer (e):

The monomer (e) is a monomer other than the monomers (a), (b), (c) and (d).

The monomer (e) may, for example, be known compounds.

The proportion of the structural units based on the monomer (a) is preferably from 30 to 80 mass %, more preferably from 50 to 80 mass %, particularly preferably from 65 to 75 mass % based on the structural units (100 mass %) based on all the monomers from the viewpoint of the post-air-drying water/oil repellency and the dynamic water repellency (heavy rain water repellency).

The proportion of the structural units based on the monomer (b) is preferably from 5 to 40 mass %, more preferably from 10 to 30 mass %, particularly preferably from 10 to 20 mass % based on the structural units (100 mass %) based on all the monomers from the viewpoint of the post-air-drying water/oil repellency and the dynamic water repellency (heavy rain water repellency).

The total proportion of the structural units based on the monomer (c) and the structural units based on the monomer (d) is preferably from 2 to 40 mass %, more preferably from 2 to 20 mass %, particularly preferably from 5 to 15 mass % based on the structural units (100 mass %) based on all the monomers from the viewpoint of the post-air-drying water/oil repellency and the dynamic water repellency (heavy rain water repellency).

The proportion of the structural units based on the monomer (e) is preferably from 0 to 50 mass %, more preferably from 0 to 30 mass %, particularly preferably from 0 to 10 mass % based on the structural units (100 mass %) based on all the monomers.

In the present invention, the proportion of the structural units based on a monomer is obtained by the NMR analysis and the elemental analysis. In a case where it cannot be obtained by the NMR analysis and the elemental analysis, it may be calculated based on the charged amount of the monomer at the time of the production of a water/oil repellent composition.

The mass average molecular weight (Mw) of the copolymer (A) is at least 50,000, particularly preferably at least 60,000. Within the above range, the post-air-drying water/oil repellency and the dynamic water repellency (heavy rain water repellency) can be further improved. The mass average molecular weight (Mw) of the copolymer (A) is preferably at most 500,000, particularly preferably at most 300,000 from the viewpoint of the film-forming property and the storage stability.

The number average molecular weight (Mn) of the copolymer (A) is preferably at least 12,000, particularly preferably at least 15,000. The number average molecular weight (Mn) of the copolymer (A) is preferably at most 300,000, particularly preferably at most 150,000.

The mass average molecular weight (Mw) and the number average molecular weight (Mn) of the copolymer (A) are a molecular weight calculated as polystyrene, as measured by gel permeation chromatography (GPC), and specifically measured by the following method.

The copolymer (A) is dissolved in tetrahydrofuran (hereinafter referred to as THF) to obtain a 0.5 mass % solution, which is passed through a 0.2 μm filter to prepare a sample for analysis. With respect to the sample, the number average molecular weight (Mn) and the mass average molecular weight (Mw) are measured under the following conditions.

Measurement temperature: 23° C.,
Injected amount: 0.2 mL,
Outflow rate: 1 mL/min,
Eluent: THF.

In the water/oil repellent composition of the present invention, it is preferred that the copolymer (A) is dispersed in the form of fine particles in the aqueous medium. The fine particles of the copolymer (A) are particularly preferably fine particles obtained by emulsion polymerization of the monomers in the aqueous medium.

The average particle size of the copolymer (A) is preferably from 10 to 1,000 nm, more preferably from 10 to 300 nm, particularly preferably from 10 to 250 nm. When the average particle size is within such a range, it will be unnecessary to use a surfactant, etc. in a large amount, the water repellency will be good, and when dyed cloths are treated, no color fading will result, and the dispersed particles can stably be present in the aqueous medium without precipitation.

The average particle size of the copolymer (A) can be measured by e.g. a dynamic light-scattering apparatus or an electron microscope.

(Aqueous Medium)

The aqueous medium contains water, at least one film-forming assistant selected from the film-forming assistant (x) and the film-forming assistant (y) and as the case requires, another medium.

The film-forming assistant (x) and the film-forming assistant (y) can make the copolymer (A) be effectively swollen or dissolved since they have good compatibility with the copolymer (A). Further, since the film-forming assistant (x) and the film-forming assistant (y) have a relatively high boiling point and are thereby less likely to evaporate at the time of air-drying as compared with water, the copolymer (A) will infiltrate into a portion where a coating film of the copolymer (A) is hardly formed such as a portion between fibers in an article (such as a fiber product) by the film-forming assistant (x) or the film-forming assistant (y), whereby a uniform coating film of the copolymer (A) can be formed. As the result, sufficient post-air-drying water/oil repellency can be imparted to an article.

The water/oil repellent composition of the present invention contains at least one film-forming assistant selected from the film-forming assistant (x) and the film-forming assistant (y). Hereinafter the film-forming assistant (x) and the film-forming assistant (y) will sometimes be generally referred as the film-forming assistant.

Film-Forming Assistant (x):
The film-forming assistant (x) is a compound (5):

$$R^1O(CH_2)_r(CHR^4)_sC(O)NR^2R^3 \quad (5)$$

wherein r is an integer of from 0 to 3, s is 0 or 1, $R^1$ is a $C_{1-4}$ alkyl group, each of $R^2$ and $R^3$ which are independent of each other, is a $C_{1-3}$ alkyl group (provided that it may contain an etheric oxygen atom), and $R^4$ is a hydrogen atom or a methyl group.

$R^1$ may be linear or branched, and is preferably linear.
$R^1$ may, for example, be a methyl group, an ethyl group, a propyl group, an isopropyl group or a n-butyl group, and is preferably a n-butyl group.

Each of $R^2$ and $R^3$ may, for example, be a methyl group, an ethyl group, a propyl group, an isopropyl group or a methoxyethyl group, and each of them is preferably a methyl group.

$R^4$ is preferably a hydrogen atom, and r+s is preferably 1 or 2.

The compound (5) may, for example, be the following compounds.

3-Methoxy-N,N-dimethylpropionamide, 3-ethoxy-N,N-dimethylpropionamide, 3-n-propoxy-N,N-dimethylpropionamide, 3-isopropoxy-N,N-dimethylpropionamide, 3-n-butoxy-N,N-dimethylpropionamide, 3-methoxy-N,N-diethylpropionamide, 3-ethoxy-N,N-diethylpropionamide, 3-n-propoxy-N,N-diethylpropionamide, 3-isopropoxy-N,N-diethylpropionamide, 3-n-butoxy-N,N-diethylpropionamide, 3-methoxy-N,N-dipropylpropionamide, 3-ethoxy-N,N-dipropylpropionamide, 3-n-propoxy-N,N-dipropylpropionamide, 3-isopropoxy-N,N-dipropylpropionamide and 3-n-butoxy-N,N-dipropylpropionamide.

3-Methoxy-2-methyl-N,N-dimethylpropionamide, 3-ethoxy-2-methyl-N,N-dimethylpropionamide, 3-n-propoxy-2-methyl-N,N-dimethylpropionamide, 3-isopropoxy-2-methyl-N,N-dimethylpropionamide, 3-n-butoxy-2-methyl-N,N-dimethylpropionamide, 3-methoxy-2-methyl-N,N-diethylpropionamide, 3-ethoxy-2-methyl-N,N-diethylpropionamide, 3-n-propoxy-2-methyl-N,N-diethylpropionamide, 3-isopropoxy-2-methyl-N,N-diethylpropionamide, 3-n-butoxy-2-methyl-N,N- diethylpropionamide, 3-methoxy-2-methyl-N,N-dipropylpropionamide, 3-ethoxy-2-methyl-N,N-dipropylpropionamide, 3-n-propoxy-2-methyl-N,N-dipropylpropionamide, 3-isopropoxy-2-methyl-N,N-dipropylpropionamide and 3-n-butoxy-2-methyl-N,N-dipropylpropionamide.

2-Methoxy-N,N-dimethylacetamide, 2-ethoxy-N,N-dimethylacetamide, 2-n-propoxy-N,N-dimethylacetamide, 2-isopropoxy-N,N-dimethylacetamide, 2-n-butoxy-N,N-dimethylacetamide, 2-methoxy-N,N-diethylacetamide, 2-ethoxy-N,N-diethylacetamide, 2-n-propoxy-N,N-diethylacetamide, 2-isopropoxy-N,N-diethylacetamide, 2-n-butoxy-N,N-diethylacetamide, 2-methoxy-N,N-dipropylacetamide, 2-ethoxy-N,N-dipropylacetamide, 2-n-propoxy-N,N-dipropylacetamide, 2-isopropoxy-N,N-dipropylacetamide and 2-n-butoxy-N,N-dipropylacetamide.

1-Methoxy-N,N-dimethylformamide, 1-ethoxy-N,N-dimethylformamide, 1-n-propoxy-N,N-dimethylformamide, 1-isopropoxy-N,N-dimethylformamide, 1-n-butoxy-N,N-dimethylformamide, 1-methoxy-N,N-diethylformamide, 1-ethoxy-N,N-diethylformamide, 1-n-propoxy-N,N-diethylformamide, 1-isopropoxy-N,N-diethylformamide, 1-n-butoxy-N,N-diethylformamide, 1-methoxy-N,N-dipropylformamide, 1-ethoxy-N,N-dipropylformamide, 1-n-propoxy-N,N-dipropylformamide, 1-isopropoxy-N,N-dipropylformamide, 1-n-butoxy-N,N-dipropylformamide, and the like.

The compound (5) is preferably 3-alkoxy-N,N-dialkylpropionamide from the viewpoint of excellent compatibility with the copolymer (A), more preferably 3-n-butoxy-N,N-dimethylpropioneamide (boiling point: 252° C.) or 3-methoxy-N,N-dimethylpropioneamide (boiling point: 204° C.), particularly preferably 3-n-butoxy-N,N-dimethylpropionamide.

Film-Forming Assistant (y):
The film-forming assistant (y) is a compound (6):

  (6)

wherein t is 3 or 4, and each of $R^5$ and $R^6$ which are independent of each other, is a $C_{1-4}$ alkyl group.

If t is at most 2, it may evaporate before water at the time of air-drying due to its low boiling point, whereby no uniform coating film of the copolymer (A) can be formed on the substrate, and no sufficient post-air-drying water/oil repellency can be imparted to an article. If t is at least 5, it will take long until it evaporates due to its high boiling point, whereby sufficient post-air-drying water/oil repellency is hardly imparted to an article due to a decrease in the water repellency by the remaining film-forming assistant and prolonged air-drying time.

Each of $R^5$ and $R^6$ may be linear or branched, and is preferably linear.

Each of $R^5$ and $R^6$ may, for example, be a methyl group, an ethyl group, a propyl group, an isopropyl group or a n-butyl group, and is preferably a methyl group.

The compound (6) may be the following compounds.

Tetraethylene glycol dimethyl ether, triethylene glycol dimethyl ether, tetraethylene glycol diethyl ether, triethylene glycol diethyl ether, tetraethylene glycol di-n-propyl ether, triethylene glycol di-n-propyl ether, tetraethylene glycol isopropyl ether, triethylene glycol isopropyl ether, tetraethylene glycol di-n-butyl ether, triethylene glycol di-n-butyl ether and the like.

The compound (6) is, from the viewpoint of excellent compatibility with the copolymer (A), preferably tetraethylene glycol dimethyl ether (boiling point: 275° C.) or triethylene glycol dimethyl ether (boiling point: 216° C.), particularly preferably tetraethylene glycol dimethyl ether.

The boiling point of each of the film-forming assistant (x) and the film-forming assistant (y) is preferably at least 100° C., more preferably at least 200° C., particularly preferably at least 250° C. When the boiling point is at least 100° C., the film-forming assistant can form a uniform coating film of the copolymer (A) on the substrate at the time of air-drying, whereby the post-air-drying water/oil repellency can be further improved.

The proportion of the film-forming assistant in the aqueous medium, i.e. the proportion of the film-forming assistant (x) and the film-forming assistant (y) in total, is preferably from 0.1 to 20 mass %, more preferably from 0.5 to 10 mass %, particularly preferably from 1 to 5 mass % in the aqueous medium (B) (100 mass %). If the proportion of the film-forming assistant is at least 0.1 mass %, the post-air-drying water/oil repellency can further be improved. If the proportion of the film-forming assistant is at most 20 mass %, the stability in an emulsified state will be favorable, precipitates and the like in the water/oil repellent composition are hardly formed, whereby an ideal process state can be realized.

The amount of the film-forming assistant in the copolymer (A), i.e. the total amount of the film-forming assistant (x) and the film-forming assistant (y) to the copolymer (A) is preferably from 10 to 4,000 parts by mass, more preferably from 50 to 2,000 parts by mass, further preferably from 300 to 1,000 parts by mass, particularly preferably from 500 to 1,000 parts by mass per 100 parts by mass of the copolymer (A). When the amount of the film-forming assistant is at least 10 parts by mass, the compatibility with the copolymer (A) will be improved, and a uniform coating film is likely to be formed on the surface of an article. When the amount of the film-forming assistant is at most 4,000 parts by mass, a uniform coating film of the copolymer (A) can be formed on the substrate, and the post-air-drying water/oil repellency can be further imparted to an article.

Another medium may, for example, be an alcohol, a glycol, a glycol ether, a halogenated compound, a ketone, an ester, an ether, a nitrogen compound, a sulfur compound or an organic acid.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, 3-heptanol or 1,4-butanediol.

The glycol and the glycol ether may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, hexylene glycol, propylene glycol, dipropylene glycol, dipropylene glycol monomethyl ether, propylene glycol monomethyl ether acetate, propylene glycol monomethyl ether, propylene glycol monoethyl ether, propylene glycol dimethyl ether, dipropylene glycol dimethyl ether, dipropylene glycol monoethyl ether, tripropylene glycol, tripropylene glycol monomethyl ether or polypropylene glycol.

The halogenated compound may, for example, be a halogenated hydrocarbon or a halogenated ether.

The halogenated hydrocarbon may, for example, be a hydrochlorofluorocarbon, a hydrofluorocarbon or a hydrobromocarbon.

The halogenated ether may, for example, be a hydrofluoroether.

The hydrofluoroether may, for example, be a separation-type hydrofluoroether or a non-separation-type hydrofluoroether. The separation-type hydrofluoroether is a compound wherein a $R^F$ group or a perfluoroalkylene group, and an alkyl group or an alkylene group, are bonded via an etheric oxygen atom. The non-separation-type hydrofluoroether is a hydrofluoroether containing a partially fluorinated alkyl or alkylene group.

The ketone may, for example, be acetone, methyl ethyl ketone, 2-pentanone, 3-pentanone, 2-hexanone or methyl isobutyl ketone.

The ester may, for example, be methyl acetate, ethyl acetate, butyl acetate, methyl propionate, methyl lactate, ethyl lactate or pentyl lactate.

The ether may, for example, be diisopropyl ether, dioxane or THF.

The nitrogen compound may, for example, be an amide such as formamide, monomethylformamide, dimethylformamide, monoethylformamide, diethylformamide, N,N-dimethylformamide, acetamide or N,N-dimethylacetamide, or N-methylpyrrolidone or pyridine.

The sulfur compound may, for example, be dimethylsulfoxide or sulfolane.

The organic acid may, for example, be acetic acid, propionic acid, malic acid or lactic acid.

The proportion of another medium is preferably at most 50 mass %, more preferably at most 40 mass %, particularly preferably from 0 to 30 mass % in the aqueous medium (100 mass %).

(Surfactant)

The water/oil repellent composition of the present invention usually contains a surfactant. This surfactant is necessary in order that fine particles of the copolymer (A) are stably dispersed in the aqueous medium (B). To produce an emulsion of the copolymer (A) obtained by polymerizing the monomers by emulsion polymerization in the aqueous medium, with the aqueous medium to be used for emulsion polymerization, a surfactant is blended. At least part of the surfactant in the water/oil repellent composition of the present invention is this surfactant used at the time of polymerization. Further, a surfactant may further be blended with the emulsion obtained by emulsion polymerization.

The surfactant may, for example, be a hydrocarbon type surfactant or a fluorinated surfactant, and each of which may, for example, be an anionic surfactant, a nonionic surfactant, a cationic surfactant, or an amphoteric surfactant. As the surfactant, from the viewpoint of the compatibility with additives, it is preferred to use a nonionic surfactant and an amphoteric surfactant in combination, and from the viewpoint of the adhesion to a substrate, it is preferred to use a nonionic surfactant alone or to use a nonionic surfactant and a cationic surfactant in combination.

The ratio of the nonionic surfactant to the cationic surfactant (nonionic surfactant/cationic surfactant) is preferably from 97/3 to 40/60 (mass ratio).

The nonionic surfactant is preferably at least one member selected from the group consisting of surfactants $s^1$ to $s^6$.

Surfactant $s^1$:

Surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As surfactant $s^1$, one type may be used alone, or two or more types may be used in combination.

As the alkyl, alkenyl, alkapolyenyl or polyfluoroalkyl group (hereinafter the alkyl, alkenyl, alkapolyenyl and polyfluoroalkyl groups may generally be referred to as a $R^s$ group), a $C_{4-26}$ group is preferred. The $R^s$ group may be linear or branched. The branched $R^s$ group is preferably a secondary alkyl group, a secondary alkenyl group or a secondary alkapolyenyl group. The $R^s$ group may have some or all of hydrogen atoms substituted by fluorine atoms.

A specific example of the $R^s$ group may, for example, be an octyl group, a dodecyl group, a tetradecyl group, a hexadecyl group, a stearyl group (an octadecyl group), a behenyl group (a docosyl group), an oleyl group (a 9-octadecenyl group), a heptadecylfluorooctyl group, a tridecylfluorohexyl group, a 1H,1H,2H,2H-tridecylfluorooctyl group or a 1H,1H,2H,2H-nonafluorohexyl group.

The polyoxyalkylene (hereinafter referred to as POA) chain is preferably a chain wherein at least two of a polyoxyethylene (hereinafter referred to as POE) chain and/or a polyoxypropylene (hereinafter referred to as POP) chain are linked. The POA chain may be a chain composed of one type of POA chain or a chain composed of two or more types of POA chains. When it is composed of two or more types of POA chains, the respective POA chains are preferably linked in a block form.

Surfactant $s_1$ is more preferably a compound ($s^{11}$).

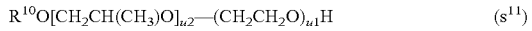

wherein $R^{10}$ is an alkyl group having at least 8 carbon atoms or an alkenyl group having at least 8 carbon atoms, u1 is an integer of from 5 to 50, and u2 is an integer of from 0 to 20. $R^{10}$ may be one wherein some of hydrogen atoms are substituted by fluorine atoms.

When u1 is at least 5, the surfactant becomes soluble in water and will be uniformly dissolved in an aqueous medium, whereby the penetrating property of the water/oil repellent composition into an article will be good. When u1 is at most 50, hydrophilicity will be suppressed, and the water repellency will be good.

When u2 is at most 20, the surfactant becomes soluble in water and will be uniformly dissolved in an aqueous medium, whereby the penetrating property of the water/oil repellent composition into an article will be good.

In a case where u1 and u2 are at least 2, the POE chains and the POP chains will be linked in a block form.

$R^{10}$ is preferably linear or branched.

u1 is preferably an integer of from 10 to 30.

u2 is preferably an integer of from 0 to 10.

The compound ($s^{11}$) may, for example, be the following compounds, whereby the POE chains and the POP chains are linked in a block form.

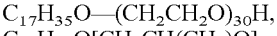
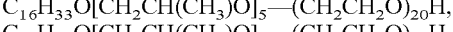
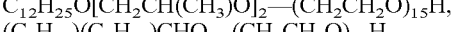
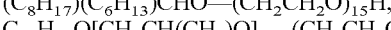
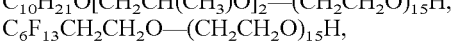
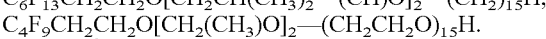

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy groups in its molecule.

Surfactant $s^2$ may have a POA chain in its molecule. The POA chain may be a POE chain, a POP chain, a chain wherein a POE chain and a POP chain are randomly linked, or a chain wherein a POE chain and a POP chain are linked in a block form.

Surfactant $s^2$ is preferably compounds ($s^{21}$) to ($s^{24}$).

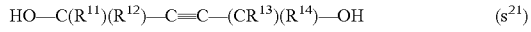  (s$^{21}$)

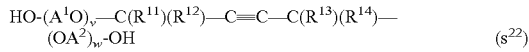  (s$^{22}$)

  (s$^{23}$)

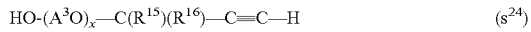  (s$^{24}$)

Each of $A^1$ to $A^3$ is an alkylene group.

Each of v and w is an integer of at least 0, and (v+w) is an integer of at least 1.

x is an integer of at least 1.

In a case where each of v, w and x is at least 2, each of $A^1$ to $A^3$ may be the same or different.

The POA chain is preferably a POE chain, a POP chain or a chain containing a POE chain and a POP chain. The number of repeating units of the POA chain is preferably from 1 to 50.

Each of $R^{11}$ to $R^{16}$ is a hydrogen atom or an alkyl group.

The alkyl group is preferably a $C_{1-12}$ alkyl group, more preferably a $C_{1-4}$ alkyl group. The alkyl group may, for example, be a methyl group, an ethyl group, a propyl group, a butyl group or an isobutyl group.

The compound ($s^{22}$) is preferably a compound ($s^{25}$):

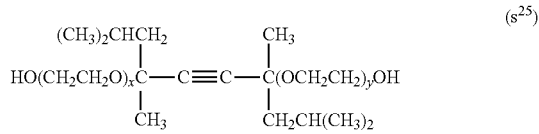  (s$^{25}$)

wherein each of y and z is an integer of from 0 to 100.

As the compound ($s^{25}$), one type may be used alone, or two or more types may be used in combination.

The compound ($s^{25}$) is preferably a compound wherein x and y are 0, a compound wherein the sum of y and z is from 1 to 4 on average, or a compound wherein the sum of y and z is from 10 to 30 on average.

Surfactant $s^3$:

Surfactant $s^3$ is a nonionic surfactant made of a compound wherein a POE chain and a POA chain having at least two oxyalkylenes having at least 3 carbon atoms continuously linked, are linked, and both terminals are hydroxy groups.

Such a POA chain is preferably polyoxybutene (hereinafter referred to as POB) and/or a POP chain.

Surfactant $s^3$ is preferably a compound ($s^{31}$) or a compound ($s^{32}$):

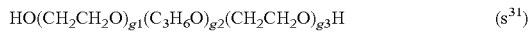  (s$^{31}$)

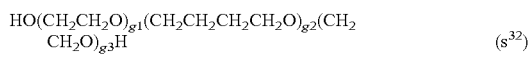  (s$^{32}$)

g1 is an integer of from 0 to 200.
g2 is an integer of from 2 to 100.
g3 is an integer of from 0 to 200.

When g1 is 0, g3 is an integer of at least 2. When g3 is 0, g1 is an integer of at least 2.

—$C_3H_6O$— may be —$CH(CH_3)CH_2O$—, —$CH_2CH(CH_3)O$—, or a mixture of —$CH(CH_3)CH_2O$— and —$CH_2CH(CH_3)O$—.

The POA chain is in a block-form.

Surfactant $s^3$ may, for example, be the following compounds:

HO—$(CH_2CH_2O)_{15}$—$(C_3H_6O)_{35}$—$(CH_2CH_2O)_{15}$H,
HO—$(CH_2CH_2O)_8$—$(C_3H_6O)_{35}$—$(CH_2CH_2O)_8$H,
HO—$(CH_2CH_2O)_{45}$—$(C_3H_6O)_{17}$—$(CH_2CH_2O)_{45}$H,
HO—$(CH_2CH_2O)_{34}$—$(CH_2CH_2CH_2CH_2O)_{28}$—$(CH_2CH_2O)_{34}$H.

Surfactant $s^4$:

Surfactant $s^4$ is a nonionic surfactant having an amine oxide moiety in its molecule.

Surfactant $s^4$ is preferably a compound ($s^{41}$):

  (s$^{41}$)

Each of $R^{17}$ to $R^{19}$ is a monovalent hydrocarbon group.

In the present invention, a surfactant having an amine oxide (N→O) is regarded as a nonionic surfactant.

As the compound ($s^{41}$), one type may be used alone, or two or more types may be used in combination.

The compound ($s^{41}$) is preferably a compound ($s^{42}$) from the viewpoint of the dispersion stability of the copolymer (A).

  (s$^{42}$)

$R^{20}$ is a $C_{6-22}$ alkyl group, a $C_{6-22}$ alkenyl group, a phenyl group having a $C_{6-22}$ alkyl group bonded thereto, a phenyl group having a $C_{6-22}$ alkenyl group bonded thereto, or a $C_{6-13}$ polyfluoroalkyl group. $R^{20}$ is preferably a $C_{8-22}$ alkyl group, a $C_{8-22}$ alkenyl group or a $C_{4-9}$ polyfluoroalkyl group.

The compound ($s^{42}$) may, for example, be the following compounds:

[H(CH$_2$)$_{12}$](CH$_3$)$_2$N(→O),
[H(CH$_2$)$_{14}$](CH$_3$)$_2$N(→O),
[H(CH$_2$)$_{16}$](CH$_3$)$_2$N(→O),
[H(CH$_2$)$_{18}$](CH$_3$)$_2$N(→O),
[F(CF$_2$)$_6$(CH$_2$)$_2$](CH$_3$)$_2$N(→O),
[F(CF$_2$)$_4$(CH$_2$)$_2$](CH$_3$)$_2$N(→O).

Surfactant $s^5$:

Surfactant $s^5$ is a nonionic surfactant made of a polyoxyethylene mono(substituted phenyl)ether or its condensate.

The substituted phenyl group is preferably a phenyl group substituted by a monovalent hydrocarbon group, more preferably a phenyl group substituted by an alkyl group, an alkenyl group or a styryl group.

Surfactant $s^5$ is preferably a condensate of a polyoxyethylenemono(alkylphenyl)ether, a condensate of a polyoxethylenemono(alkenylphenyl)ether, a polyoxyethylenemono(alkylphenyl)ether, a polyoxyethylenemono(alkenylphenyl)ether or a polyoxyethylenemono[(alkyl)(styryl)phenyl]ether.

The polyoxyethylenemono(substituted phenyl)ether or its condensate may, for example, be a formaldehyde condensate of polyoxyethylenemono(nonylphenyl)ether, polyoxyethylenemono(nonylphenyl)ether, polyoxyethylenemono(octylphenyl)ether, polyoxyethylenemono(oleylphenyl)ether, polyoxyethylenemono[(nonyl)(styryl)phenyl]ether or polyoxyethylenemono[(oleyl)(styryl)phenyl]ether.

Surfactant $s^6$:

Surfactant $s^6$ is a nonionic surfactant made of a fatty acid ester of a polyol.

The polyol represents glycerol, sorbitan, sorbit, polyglycerin, polyethylene glycol, polyoxyethylene glyceryl ether, polyoxyethylenesorbitan ether or polyoxyethylenesorbit ether.

Surfactant $s^6$ may be a 1:1 (molar ratio) ester of stearic acid and polyethylene glycol, a 1:4 (molar ratio) ester of an ether of sorbit with polyethylene glycol and oleic acid, a 1:1 (molar ratio) ester of an ether of polyoxyethylene glycol with sorbitan and stearic acid, a 1:1 (molar ratio) ester of an ether of polyethylene glycol with sorbitan and oleic acid, a 1:1 (molar ratio) ester of dodecanoic acid and sorbitan, a 1:1 or 2:1 (molar ratio) ester of oleic acid and decaglycerol, or a 1:1 or 2:1 (molar ratio) ester of stearic acid and decaglycerol.

Surfactant $s^7$:

In a case where the surfactant contains a cationic surfactant, such a cationic surfactant is preferably surfactant $s^7$.

Surfactant $s^7$ is a cationic surfactant in a substituted ammonium salt form.

Surfactant $s^7$ is preferably an ammonium salt having at least one hydrogen atom bonded to the nitrogen atom substituted by an alkyl group, an alkenyl group or a POA chain having a terminal hydroxy group, more preferably a compound ($s^{71}$):

$R^{21}$ is a hydrogen atom, a $C_{1-22}$ alkyl group, a $C_{2-22}$ alkenyl group, a $C_{1-9}$ polyfluoroalkyl group or a POA chain having a terminal hydroxy group. Four $R^{21}$ may be the same or different, provided that the four $R^{21}$ are not simultaneously hydrogen atoms.

$R^{21}$ is preferably a $C_{6-22}$ long chain alkyl group, a $C_{6-22}$ long chain alkenyl group or a $C_{1-9}$ fluoroalkyl group.

In a case where $R^{21}$ is an alkyl group other than the long chain alkyl group, $R^{21}$ is preferably a methyl group or an ethyl group.

In a case where $R^{21}$ is a POA chain having a terminal hydroxy group, the POA chain is preferably a POE chain.

$X^-$ is a counter ion.

$X^-$ is preferably a chlorine ion, an ethylsulfuric acid ion or an acetic acid ion.

The compound ($s^{71}$) may, for example, be monostearyl trimethylammonium chloride, monostearyldimethylmonoethylammonium ethylsulfate, mono(stearyl)monomethyldi(polyethylene glycol) ammonium chloride, monofluorohexyl trimethylammonium chloride, di(tallow alkyl)dimethylammonium chloride or dimethylmonococonutamine acetate.

Surfactant $s^8$:

In a case where the surfactant contains an amphoteric surfactant, such an amphoteric surfactant is preferably surfactant $s^8$.

Surfactant $s^8$ is an alanine, an imidazolinium betaine, an amide betaine or an acetic acid betaine.

The hydrophobic group is preferably a $CO_{6-22}$ long chain alkyl group, a $C_{6-22}$ long chain alkenyl group or a $C_{1-9}$ polyfluoroalkyl group.

Surfactant $s^8$ may, for example, be dodecyl betaine, stearyl betaine, dodecylcarboxymethylhydroxyethylimidazolinium betaine, dodecyldimethylaminoacetic acid betaine or a fatty acid amide propyldimethylaminoacetic acid betaine.

Specific examples include a lauryl dimethylaminoacetic acid betaine aqueous solution (NIKKOL AM-301 manufactured by Nikko Chemicals Co., Ltd.), a coconut oil fatty acid amidopropyldimethylaminoacetic acid betaine aqueous solution (NIKKOL AM-3130N manufactured by Nikko Chemicals Co., Ltd.) and a sodium N-cocoyl-N-carboxymethyl-N-hydroxyethylethylenediamine aqueous solution (NIKKOL AM-101 manufactured by Nikko Chemicals Co., Ltd.).

Surfactant $s^9$:

Surfactant $s^9$ is a polymer surfactant made of a block copolymer or a random copolymer of a hydrophilic monomer with a hydrocarbon type hydrophobic monomer and/or a fluorinated hydrophobic monomer, or a hydrophobically modified product of a hydrophilic copolymer.

Surfactant $s^9$ may, for example, be a block or random copolymer of polyethylene glycol (meth)acrylate with a long chain alkyl acrylate, a block or random copolymer of polyethylene glycol (meth)acrylate with a fluoro (meth)acrylate, a block or random copolymer of vinyl acetate with a long chain alkyl vinyl ether, a block or random copolymer of vinyl acetate with a long chain alkyl vinyl ester, a polymer of styrene with maleic anhydride, a condensate of polyvinyl alcohol with stearic acid, a condensate of polyvinyl alcohol with stearyl mercaptan, a condensate of polyallylamine with stearic acid, a condensate of polyethyleneimine with stearyl alcohol, methylcellulose, hydroxypropyl methylcellulose or hydroxyethyl methylcellulose.

Commercial products of surfactant $s^9$ include, for example, MP polymer (Product No.: MP-103 or MP-203) manufactured by Kuraray corporation, SMA resins manufactured by Elf Atochem Inc, METOLOSE manufactured by Shin-Etsu Chemical Co., Ltd., EPOMIN RP manufactured by NIPPON SHOKUBAI Co., Ltd. and Surflon (Product No.: S-381 or S-393) manufactured by AGC Seimi Chemical Co., Ltd.

In a case where the medium is an organic solvent, or the mixing ratio of an organic solvent is large, surfactant $s^9$ is preferably surfactant $s^{91}$.

Surfactant $s^{91}$: A polymer surfactant made of a block copolymer or random copolymer of a lipophilic monomer with a fluorinated monomer (or its polyfluoroalkyl modified product).

Surfactant $s^{91}$ may, for example, be a copolymer of an alkyl acrylate with a fluoro (meth)acrylate, or a copolymer of an alkyl vinyl ether with a fluoroakyl vinyl ether.

Commercial products of surfactant $s^{91}$ include Surflon (Product No.: S-383 or SC-100 series) manufactured by AGC Seimi Chemical Co., Ltd.

As a combination of surfactants, from the viewpoint of the adhesion to a substrate and the stability of the obtained emulsion, preferred is a combination of surfactants $s^1$ and $s^2$, a combination of surfactants $s^1$ and $s^3$, a combination of surfactants $s^1$, $s^2$ and $s^3$, a combination of surfactants $s^1$ and/or $s^2$ and $s^7$, a combination of surfactants $s^1$, $s^3$ and $s^7$ or a combination of surfactants $s^1$, $s^2$, $s^3$ and $s^7$, and more preferred is the above combination wherein the surfactant $s^7$ is the compound ($s^{71}$). From the viewpoint of the compatibility with additives, preferred is a combination of surfactants $s^1$ and/or $s^2$ and $s^8$, or a combination of surfactants $s^1$, $s^2$, $s^3$ and $s^8$.

As the surfactant, it is preferred to use a surfactant having HLB of at most 12 in combination, in a case where the penetrating property to an article (such as a fiber product) is to be imparted. HLB is a value representing the degree of the affinity of a surfactant to water and oil, and is represented on a scale of from 0 to 20. A smaller value indicates lipophilicity, and a larger value indicates hydrophilicity. Several means have been proposed to calculate this value. For example, by the Griffin's method, it is defined as 20× the total formula weight of the hydrophilic portion/the molecular weight.

As surfactants having HLB of at most 12, the following are preferred.

Surfactant $s^1$: The compound ($s^{11}$) wherein s+r is an integer of from 2 to 10 (preferably from 3 to 8), and r is an integer of from 2 to 10 (preferably from 3 to 8).

Surfactant $s^2$: The compound ($s^{25}$) wherein x+y is at most 4.

Surfactant $s^6$: A sorbitan fatty acid ester, wherein the fatty acid has from 5 to 30 carbon atoms. Specific examples include polyoxyethylene 2 mol adduct oleyl ether (NIKKOL BO-2V manufactured by Nikko Chemicals Co., Ltd., HLB: 7.5), polyoxyethylene 7 mol adduct oleyl ether (NIKKOL BO-7V manufactured by Nikko Chemicals Co., Ltd., HLB: 10.5), polyoxyethylene 5 mol adduct behenyl ether (NIKKOL BB-5 manufactured by Nikko Chemicals Co., Ltd., HLB: 10.5), polyoxyethylene 4 mol adduct C12-15 alkyl ether (NIKKOL BD-4 manufactured by Nikko Chemicals Co., Ltd., HLB: 10.5), polyoxyethylene 1 mol polyoxypropylene 4 mol adduct cetyl ether (NIKKOL PBC-31 manufactured by Nikko Chemicals Co., Ltd., HLB: 9.5), 2,4,7,9-tetramethyl-5-decyne-4,7-diol ethylene oxide 3.5 mol adduct (Surfynol 440 manufactured by Nissin Chemical Industry Co., Ltd., HLB: 8), 2,4,7,9-tetramethyl-5-decyne-4,7-diol ethylene oxide 1.3 mol adduct (Surfynol 420 manufactured by Nissin Chemical Industry Co., Ltd., HLB: 4), 2,4,7,9-tetramethyl-5-decyne-4,7-diol (Surfynol 104 manufactured by Nissin Chemical Industry Co., Ltd., HLB: 4) and sorbitan palmitate (NONION PP-40R manufactured by NOF Corporation, HLB: 6.7).

The amount of the surfactant is preferably from 1 to 10 parts by mass, more preferably from 1 to 9 parts by mass, particularly preferably from 1 to 7 parts by mass per 100 parts by mass of the copolymer (A).

(Additives)

The additives include, for example, a penetrant, a defoamer, a water-absorbing agent, an antistatic agent, an antistatic polymer, an anticrease agent, a texture-adjusting agent, a water-soluble polymer (such as polyacrylamide or polyvinyl alcohol), a thermosetting agent (such as a melamine resin, a urethane resin, a triazine ring-containing compound or an isocyanate-type compound), an epoxy curing agent (such as isophthalic acid dihydrazide, adipic acid dihydrazide, sebacic acid dihydrazide, dodecanedioic acid dihydrazide, 1,6-hexamethylenebis(N,N-dimethylsemicarbazide), 1,1,1', 1'-tetramethyl-4,4'-(methylene-di-p-phenylene) disemicarbazide or spiroglycol), a thermosetting catalyst, a crosslinking catalyst (such as an organic acid or ammonium chloride), a synthetic resin, a fiber-stabilizer and inorganic fine particles.

Further, the water/oil repellent composition of the present invention may contain a copolymer capable of exhibiting water repellency and/or oil repellency (e.g. a commercially available water repellent, a commercially available oil repellent, a commercially available water/oil repellent or a commercially available SR (soil release) agent) other than the copolymer (A), a water-repellent compound having no fluorine atom, or the like as the case requires. The water-repellent compound having no fluorine atom may, for example, be a paraffin type compound, an aliphatic amide type compound, an alkylethylene urea compound or a silicone compound.

(Method for Producing Water/Oil Repellent Composition)

The water/oil repellent composition of the present invention is produced, for example, by the following method (α) or (β).

(α) A method which comprises polymerizing the monomer components in an aqueous medium in the presence of a surfactant and a polymerization initiator to obtain a dispersion or emulsion of the copolymer (A), and blending at least one film-forming assistant selected from the film-forming assistant (x) and the film-forming assistant (y) therewith. As the case requires, a medium such as water, a surfactant, an additive, or the like may be blended with the produced dispersion or emulsion, as well as blending of the film-forming assistant.

(β) A method which comprises polymerizing the monomer components in an aqueous medium containing at least one film-forming assistant selected from the film-forming assistant (x) and the film-forming assistant (y) in the presence of a surfactant and a polymerization initiator to obtain a dispersion or emulsion of the copolymer (A). As the case requires, a medium such as water, a surfactant, an additive, or the like may be blended with the produced dispersion or emulsion. Further, with the produced dispersion or emulsion, at least one film-forming assistant selected from the film-forming assistant (x) and the film-forming assistant (y) may further be blended.

In these methods, blending of a film-forming assistant or a medium such as water with the dispersion or emulsion obtained by polymerization will sometimes be referred to as dilution.

The polymerization method may, for example, be a dispersion polymerization method, an emulsion polymerization method or a suspension polymerization method, and emulsion polymerization is preferred. Further, the polymerization method may be polymerization all at once or multistage polymerization.

The polymerization method is preferably a method of polymerizing the monomer components by emulsion polymerization in an aqueous medium containing water and another medium as the case requires, in the presence of a surfactant and a polymerization initiator to obtain an emulsion of the copolymer (A).

With a view to improving the yield of the polymer, it is preferred to pre-emulsify a mixture comprising the monomers, the surfactant and the aqueous medium, prior to the emulsion polymerization. For example a mixture comprising the monomers, the surfactant and the aqueous medium is mixed and dispersed by an ultrasonic stirring apparatus, a homomixer or a high pressure emulsifier.

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The azo type compound and the salt of an azo type compound may be 2,2'-azobis(4-methoxy-2,4-dimethylvaleronitrile), 2,2'-azobis(2,4-dimethylvaleronitrile), dimethyl 2,2'-azobis(2-methylpropionate), 2,2'-azobis(2-methylbutyronitrile), 2,2'-azobis(2-methylpropionamide) dihydrochloride, 2,2'-azobis[2-(2-imidazolin-2-yl)propane] disulfate, 2,2'-azobis[2-(2-imidazolin-2-yl)propane]dihydrochloride, 2,2'-azobis[2-(2-imidazolin-2-yl)propane]acetate, 2,2'-azobis[N-(2-carboxyethyl)-2-methylpropionamidine]hydrate or 2,2'-azobis(1-imino-1-pyrrolidino-2-methylpropane) dihydrochloride. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer components.

At the time of polymerization of the monomer components, a molecular weight-controlling agent may be employed. The molecular weight-controlling agent is preferably an aromatic compound, a mercapto alcohol or a mercaptan, particularly preferably an alkylmercaptan. The molecular weight-controlling agent may, for example, be mercaptoethanol, n-octylmercaptan, n-dodecylmercaptan, t-dodecylmercaptan, stearylmercaptan, thioglycerol, α-methylstyrene dimer ($CH_2$=$C(Ph)CH_2C(CH_3)_2Ph$ wherein Ph is a phenyl group), or a multifunctional mercapto compound such as diethylene glycol bis(3-mercaptobutyrate), pentaerythritol tetrakis(3-mercaptobutyrate), 2,4,6-trimercaptotriazine, or 1,3,5-tris(3-mercaptobutyloxyethyl)-1,3,5-triazine-2,4,6 (1H,3H,5H)-trione.

The amount of addition of the molecular weight-controlling agent is preferably from 0 to 5 parts by mass, more preferably from 0 to 2 parts by mass per 100 parts by mass of the monomer components.

The proportion of the monomers (a) to (e) is the same as the proportion of the structural units based on the monomers (a) to (e) since these monomers are copolymerized substantially 100%, and the preferred embodiments are also the same.

In the method ($\alpha$), the aqueous medium at the time of polymerizing the monomer components does not contains the film-forming assistant and comprises water, or in some cases, it is a mixture of a medium other than water and water. By blending the film-forming assistant with the dispersion or emulsion obtained by polymerization, the aqueous medium in the dispersion of emulsion after blending becomes the aqueous medium (B). Water or another medium may be blended with the dispersion or emulsion obtained by polymerization for dilution, as well as blending of the film-forming assistant. Further, as the case requires, the surfactant or additives may be blended with the dispersion or emulsion produced by polymerization. The surfactant to be blended may be the same type of the surfactant as the surfactant added to the aqueous medium at the time of polymerization or may be different. Part or whole of the additives may be added to the aqueous medium used at the time of polymerization.

In the method ($\beta$), the aqueous medium used at the time of polymerizing the monomer components contains the film-forming assistant, and the aqueous medium in the dispersion or emulsion obtained by polymerization is the aqueous medium (B). In the method ($\beta$), as the case requires, the film-forming assistant, water or another medium may further be blended with the dispersion or emulsion obtained by polymerization for dilution. Further, as the case requires, the surfactant or additives may be blended with the dispersion or emulsion obtained by polymerization. The surfactant to be blended may be the same type of the surfactant as the surfactant added to the aqueous medium at the time of polymerization or may be different. Part or whole of the additives may be added to the aqueous medium used at the time of polymerization.

In each of the method ($\alpha$) and the method ($\beta$), the polymerization method is preferably emulsion polymerization, and by emulsion polymerization, an emulsion in which fine particles of the copolymer (A) are stably dispersed in the aqueous medium will be obtained. This emulsion has favorable dispersion stability even when water, the film-forming assistant, another medium, etc are blended therewith.

The water/oil repellent composition of the present invention is preferably an emulsion produced by the method ($\alpha$). Particularly by the method ($\alpha$), a water/oil repellent composition having favorable dispersion stability, containing a relatively large amount of the film-forming assistant, can easily be obtained. Further, by the method ($\alpha$), as compared with the method ($\beta$), the proportion of the film-forming assistant can easily be adjusted depending on the type of an article and the conditions of treating an article. Further, it is easy to adjust the composition of the aqueous medium in the water/oil repellent composition. For example, by the method ($\alpha$), the optimum amount of the film-forming assistant can easily be set depending upon the type of an article such as cloth, the treating conditions (e.g. bath temperature or air-drying temperature).

Immediately after emulsion polymerization (i.e. before dilution), the solid content concentration of the emulsion is preferably from 20 to 40 mass % based on the emulsion (100 mass %). Here, the solid content concentration is a concentration including the surfactant in addition to the copolymer (A). The proportion of the copolymer (A) in the emulsion is preferably from 18 to 40 mass % immediately after emulsion polymerization.

At the time of treating an article, the solid content concentration of the water/oil repellent composition of the present invention is preferably from 0.2 to 5 mass % in the water/oil repellent composition (100 mass %). Accordingly, usually, the emulsion produced by emulsion polymerization is diluted with at least one of water, the film-forming assistant and another medium, and the diluted emulsion is used for treatment of an article.

The solid content concentration of the emulsion or the water/oil repellent composition is calculated from the mass of the emulsion or the water/oil repellent composition before heating and the mass after drying for 4 hours by a counter current canal dryer at 120° C.

(Effect and Function)

The water/oil repellent composition of the present invention as described in the foregoing, which comprises the copolymer (A) and the aqueous medium (B) containing water and at least one film-forming assistant selected from the film-forming assistant (x) and the film-forming assistant (y) as essential components, can impart sufficient post-air-drying water/oil repellency to the surface of an article.

Further, in the water/oil repellent composition of the present invention, the copolymer (A) has no structural units based on a monomer having a $R^F$ group having at least 7 carbon atoms, whereby the content (content in a case where the solid content concentration is 20 mass %) of perfluorooctanoic acid (PFOA) and perfluorooctanesulfonic acid (PFOS), and their precursors and analogues, of which the effects on the environment are pointed out, can be reduced to a level of not higher than the detection limit as an analytical value of LC-MS/MS by the method disclosed in WO2009/081822.

<Article>

The article of the present invention is one having its surface treated with the water/oil repellent composition of the present invention, and having a coating film of the copolymer (A) formed on its surface.

Articles to be treated include, for example, fibers (natural fibers, synthetic fibers, mixed fibers, etc.), various fiber products, nonwoven fabrics, resins, paper, leather, metals, stones, concrete, gypsum and glass.

The treating method may, for example, be a method of coating an article with a coating liquid containing the water/oil repellent composition by a known coating method, followed by drying, or a method of dipping an article in a coating liquid containing the water/oil repellent composition, followed by drying.

Further, after treatment with the water/oil repellent composition of the present invention, antistatic finish, softening finish, antibacterial finish, deodorant finish or waterproofing finish may, for example, be carried out.

The waterproofing finish may be processing to provide a waterproofing film. The waterproofing film may, for example, be a porous film made of a urethane resin or an acrylic resin, a non-porous film made of a urethane resin or an acrylic resin, a polytetrafluoroethylene film or a moisture-permeable waterproofing film made of a combination thereof.

By treating an article by means of the water/oil repellent composition of the present invention, a coating film of the copolymer (A) is formed on the surface of the article, whereby water/oil repellency can be imparted to the article. Further, the formed coating film has excellent adhesion to the surface or the article and it is possible to impart the water/oil repellency even by curing at a low temperature. Further, it is possible to maintain the initial performance stably without substantial deterioration of the performance by abrasion or washing. Further, when paper is treated, it is possible to impart an excellent sizing property and water/oil repellency to the paper even under a low temperature drying condition. In a case where it is applied to the surface of a resin, glass or a metal, it is possible to form a water/oil repellent coating film which is excellent in the adhesion to the article and which is excellent in the film-forming property.

EXAMPLES

Now, the present invention will be described in detail with reference to Examples, but it should be understood that the present invention is by no means thereby restricted.

Examples 1 to 17 are Production Examples, Examples 18 to 20, 33 to 35, 40 to 43, 52, 53 and 57 are Examples of the present invention, and Examples 21 to 32, 36 to 39, 44 to 51, 54 to 56 and 58 to 65 are Comparative Examples.

<Evaluation of Test Cloth>
(Oil Repellency)
With respect to a test cloth, the oil repellency was evaluated in accordance with the test method in AATCC-TM118-1966. The oil repellency is represented by grades shown in Table 1. A grade having +(−) attached shows that the property is slightly better (worse).

TABLE 1

| Oil repellency No. | Test solution | Surface tension mN/m (25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/35 parts of hexadecane | 29.6 |
| 1 | Nujol | 31.2 |
| 0 | Less than 1 | — |

(Water Repellency)
With respect to a test cloth, the water repellency was evaluated in accordance with the spray test in JIS L1092-1992. The water repellency is represented by five grades of from 1 to 5. The higher the grade number, the better the water repellency. A grade having +(−) attached shows that the property is slightly better (worse) than the standard property of that grade.

(Dynamic Water Repellency)
With respect to a test cloth, in accordance with the method (Bundesmann test) disclosed in JIS L1092 method (C), a rainfall test was carried out under such conditions that the amount of rainfall was 80 cc/min, the water temperature of rainfall was 20° C. and the time for rainfall was 10 minutes, whereby the water repellency was evaluated. The water repellency was represented by five grades of from 1 to 5. The larger the grade number, the better the water repellency. A grade having +(−) attached shows that the property is slightly better (worse).

<Abbreviations>
(Monomer (a))
C6FMA: $F(CF_2)_6CH_2CH_2OC(O)C(CH_3)=CH_2$
(Monomer (b))
VdCl: Vinylidene chloride (Tg: −18° C.)

(Monomer (c))
VCl: Vinyl chloride (Tg: 82° C.)
VA: Behenyl acrylate (Tg: 66° C.)
StA: Stearyl acrylate (Tg: 47° C.)
StMA: Stearyl methacrylate (Tg: 35° C.)
CetMA: Cetyl methacrylate (Tg: 23.5° C.)
CyhMA: Cyclohexyl methacrylate (Tg: 66° C.)
n-BuMA: n-Butyl methacrylate (Tg: 20° C.)
IB-X: Isobornyl methacrylate (Tg: 180° C.)
(Monomer (d))
HEA: 2-Hydroxyethyl acrylate
(Monomer (e))
CmFA: $F(CF_2)_mCH_2CH_2OC(O)CH=CH_2$ (a mixture wherein m is from 6 to 16, containing at least 99 mass % of ones wherein m is at least 8, and the average value of m is 9)
LaA: Lauryl acrylate (Tg: 15° C.)
EtA: Ethyl acrylate (Tg: −22° C.)
(Surfactant)
E-430: Polyoxyethylene oleyl ether (Emulgen E430 manufactured by Kao Corporation)
SFN-465: 2,4,7,9-Tetramethyl-5-decyne-4,7diol ethylene oxide adduct (Surfynol 465 manufactured by Nissin Chemical Industry Co., Ltd.)
P-204: Ethylene oxide propylene oxide polymer (PRONONE 204 manufactured by NOF Corporation)
Aq-18: Stearyl trimethylammonium chloride (ARQUAD 18-63 manufactured by Lion Corporation)
Aq-C: Lauryl trimethylammonium chloride (ARQUAD C-50 manufactured by Lion Corporation)
(Molecular Weight-Controlling Agent)
StSH: Stearyl mercaptan
(Polymerization Initiator)
VA-061A: Acetate of 2,2'-azobis[2-(2-imidazolin-2-yl)propane](VA-061 manufactured by Wako Pure Chemical Industries, Ltd.)
(Water)
Water: Deionized water
(Film-Forming Assistant (x))
DMBuPA: 3-n-Butoxy-N,N-dimethylpropionamide (Equamide B100 manufactured by Idemitsu Kosan Co., Ltd., boiling point: 252° C.)
(Film-Forming Assistant (y))
TeEGDME: Tetraethylene glycol dimethyl ether (boiling point: 275° C.)
(Other Medium (Other Film-Forming Assistant))
DPG: Dipropylene glycol (boiling point: 232° C.)
EGDMA: Ethylene glycol dimethyl ether (boiling point: 83° C.)
DEGDMA: Diethylene glycol dimethyl ether (boiling point: 162° C.)
TrPG: Tripropylene glycol (boiling point: 232° C.)
DPGMMA: Dipropylene glycol monomethyl ether (boiling point: 190° C.)

Example 1

Into a glass beaker, 178.0 g of C6FMA, 12.8 g of VA, 12.8 g of IB-X, 1.28 g of HEA, 5.11 g of E-430, 2.55 g of SFN-465, 2.55 g of P-204, 2.55 g of Aq-18, 1.28 g of Aq-C, 1.28 g of StSH, 76.6 g of DPG and 404.7 g of water were introduced, heated at 65° C. for 40 minutes and mixed by means of a mixer (HIGH-FLEX DISPERSER HG-92 manufactured by SMT Corporation) to obtain a preliminarily emulsified liquid.

The obtained preliminarily emulsified liquid was treated under an emulsion pressure of 40 MPa at 1 pass by means of a high pressure emulsifying machine (LAB60 manufactured by Gaulin) while maintaining the temperature at 60° C. to obtain an emulsified liquid. The obtained emulsified liquid was put into a stainless steel reactor and cooled to a temperature of at most 20° C., and 48.5 g of VdCl and 1.28 g of VA-061A were added. The vapor phase was substituted by nitrogen, and a polymerization reaction was carried out at 60° C. for 12 hours to obtain an emulsion of copolymer (A-1). The proportions of structural units based on the respective monomers are shown in Table 2.

Examples 2 to 17

An emulsion of copolymer was obtained in the same manner as in Example 1 except that the charged amounts of the respective monomers agreed with the proportions of the structural units based on the respective monomers as identified in Table 2. The proportions of structural units based on the respective monomers are shown in Table 2.

Example 25

The emulsion of copolymer (A-1) was diluted with water to obtain a water/oil repellent composition having a solid content concentration of 0.6 mass %.

Test cloths were obtained in the same manner as in Example 18 except that the above water/oil repellent composition was used. The results of evaluation of the test cloths are shown in Table 3.

Examples 26 to 31, 36 to 39, 44 to 47, 50 and 51

Test cloths were obtained in the same manner as in Example 25 except that the copolymer (A-1) was changed as identified in Table 3. The results of evaluation of the test cloths are shown in Table 3.

TABLE 2

| | | (a) C6 FMA | (e) Cm FA | (b) VdCl | (c) VCl | (c) VA | (c) StA | (c) St MA | (c) Cet MA | (c) Cyh MA | (c) n-Bu MA | (e) LaA | (e) EtA | (c) IB-X | (d) HEA |
|---|---|---|---|---|---|---|---|---|---|---|---|---|---|---|---|
| Ex. | Copolymer | | | | | | | | | | | | | | |
| 1 | A-1 | 70.5 | | 19 | | 5 | | | | | | | | 5 | 0.5 |
| 2 | A-2 | 70.5 | | 19 | | | 5 | | | | | | | 5 | 0.5 |
| 3 | A-3 | 70.5 | | 12 | 7 | | 5 | | | | | | | 5 | 0.5 |
| 4 | A'-4 | | 70.5 | | 19 | | 10 | | | | | | | | 0.5 |
| 5 | A'-5 | 20 | | | 19 | 60.5 | | | | | | | | | 0.5 |
| 6 | A'-6 | 70.5 | | | 19 | | 10 | | | | | | | | 0.5 |
| 7 | A'-7 | 70.5 | | | 19 | | | 10 | | | | | | | 0.5 |
| 8 | A'-8 | 80 | | 20 | | | | | | | | | | | |
| 9 | A-9 | 70.5 | | 20 | | 9.5 | | | | | | | | | |
| 10 | A-10 | 70.5 | | 20 | | | | | | | | | 9.5 | | |
| 11 | A-11 | 78 | | 20 | | | | | | | | | | | 2 |
| 12 | A-12 | 70.5 | | 19.5 | | | 10 | | | | | | | | |
| 13 | A-13 | 70.5 | | 19.5 | | | | 10 | | | | | | | |
| 14 | A-14 | 70.5 | | 19.5 | | | | | 10 | | | | | | |
| 15 | A-15 | 70.5 | | 19.5 | | | | | | 10 | | | | | |
| 16 | A'-16 | 70.5 | | 19.5 | | | | | | | 10 | | | | |
| 17 | A'-17 | 70.5 | | 19.5 | | | | | | | | 10 | | | |

Example 18

The emulsion of copolymer (A-1) was diluted with water, and DMBuPA was added to obtain a water/oil repellent composition having a solid content concentration of 0.6 mass % and a DMBuPA concentration of 2.0%.

In the water/oil repellent composition, ultrafine polyester wooly and high density nylon taffeta were dipped and squeezed so that the wet pickups became 63 mass % and 57 mass %, respectively. They were air-dried at a temperature of 23° C. under a humidity of 50% for 24 hours to prepare test cloths. With respect to the test cloths, evaluation was carried out. The results are shown in Table 3.

Examples 19 to 24, 32 to 35, 40 to 43, 48 and 49

Test cloths were obtained in the same manner as in Example 18 except that the copolymer (A-1) was changed as identified in Table 3. The results of evaluation of the test cloths are shown in Table 3.

TABLE 3

| Ex. | Co-polymer | Solid content [mass %] | DMBuPA [mass %] | Ultrafine polyester wooly | | |
|---|---|---|---|---|---|---|
| | | | | Oil repellency | Water repellency | Dynamic water repellency |
| 18 | A-1 | 0.6 | 2.0 | 5 | 5 | 5 |
| 19 | A-2 | 0.6 | 2.0 | 5 | 5 | 5 |
| 20 | A-3 | 0.6 | 2.0 | 5 | 5 | 5 |
| 21 | A'-4 | 0.6 | 2.0 | 0 | 2 | 1 |
| 22 | A'-5 | 0.6 | 2.0 | 0 | 0 | 1 |
| 23 | A'-6 | 0.6 | 2.0 | 2 | 4+ | 1+ |
| 24 | A'-7 | 0.6 | 2.0 | 6 | 4+ | 2+ |
| 25 | A-1 | 0.6 | 0 | 1– | 2+ | 1 |
| 26 | A-2 | 0.6 | 0 | 1– | 2 | 1 |
| 27 | A-3 | 0.6 | 0 | 1 | 2+ | 1 |
| 28 | A'4 | 0.6 | 0 | 0 | 0 | 1 |
| 29 | A'-5 | 0.6 | 0 | 0 | 0 | 1 |
| 30 | A'-6 | 0.6 | 0 | 0 | 2+ | 1 |
| 31 | A'-7 | 0.6 | 0 | 2– | 2 | 1 |
| 32 | A'-8 | 0.6 | 2.0 | 3– | 5– | 2– |
| 33 | A-9 | 0.6 | 2.0 | 6– | 5 | 5 |
| 34 | A-10 | 0.6 | 2.0 | 5– | 5 | 5 |
| 35 | A-11 | 0.6 | 2.0 | 5 | 5 | 5 |
| 36 | A'-8 | 0.6 | 0 | 1 | 2 | 1 |

TABLE 3-continued

| Ex. | Copolymer | | | | |
|---|---|---|---|---|---|
| 37 | A-9 | 0.6 | 0 | 1− | 2+ | 1 |
| 38 | A-10 | 0.6 | 0 | 0 | 2 | 1 |
| 39 | A-11 | 0.6 | 0 | 0 | 2+ | 1 |
| 40 | A-12 | 0.6 | 2.0 | 6− | 5 | 5 |
| 41 | A-13 | 0.6 | 2.0 | 6− | 5 | 5 |
| 42 | A-14 | 0.6 | 2.0 | 5− | 5 | 5 |
| 43 | A-15 | 0.6 | 2.0 | 5 | 5 | 5 |
| 44 | A-12 | 0.6 | 0 | 2− | 3 | 1 |
| 45 | A-13 | 0.6 | 0 | 2− | 3 | 1 |
| 46 | A-14 | 0.6 | 0 | 0 | 2 | 1 |
| 47 | A-15 | 0.6 | 0 | 2− | 2+ | 1 |
| 48 | A'-16 | 0.6 | 2.0 | 6− | 5 | 5 |
| 49 | A'-17 | 0.6 | 2.0 | 6− | 5 | 4+ |
| 50 | A'-16 | 0.6 | 0 | 3− | 4− | 1 |
| 51 | A'-17 | 0.6 | 0 | 2− | 3+ | 1 |

| | | High density nylon taffeta | | |
|---|---|---|---|---|
| Ex. | Copolymer | Oil repellency | Water repellency | Dynamic water repellency |
| 18 | A-1 | 5 | 5 | 4+ |
| 19 | A-2 | 5 | 5 | 4+ |
| 20 | A-3 | 5 | 5 | 4+ |
| 21 | A'-4 | 0 | 2+ | 1 |
| 22 | A'-5 | 0 | 0 | 1 |
| 23 | A'-6 | 1 | 4 | 2 |
| 24 | A'-7 | 5 | 4 | 2 |
| 25 | A-1 | 1− | 3 | 1 |
| 26 | A-2 | 1− | 2+ | 1 |
| 27 | A-3 | 1 | 3 | 1 |
| 28 | A'-4 | 0 | 0 | 1 |
| 29 | A'-5 | 0 | 0 | 1 |
| 30 | A'-6 | 0 | 2+ | 1 |
| 31 | A'-7 | 2− | 2 | 1 |
| 32 | A'-8 | 2− | 3+ | 1+ |
| 33 | A-9 | 5− | 5 | 4 |
| 34 | A-10 | 4 | 5 | 4 |
| 35 | A-11 | 4 | 5 | 4 |
| 36 | A'-8 | 1 | 2+ | 1 |
| 37 | A-9 | 1− | 3− | 1 |
| 38 | A-10 | 0 | 2 | 1 |
| 39 | A-11 | 0 | 2 | 1 |
| 40 | A-12 | 5 | 5 | 4 |
| 41 | A-13 | 5 | 5 | 4 |
| 42 | A-14 | 5− | 5 | 4 |
| 43 | A-15 | 5 | 5 | 3+ |
| 44 | A-12 | 2− | 4 | 1 |
| 45 | A-13 | 2− | 4 | 1 |
| 46 | A-14 | 0 | 2+ | 1 |
| 47 | A-15 | 2− | 3+ | 1 |
| 48 | A'-16 | 6− | 5− | 2 |
| 49 | A'-17 | 6− | 5− | 2+ |
| 50 | A'-16 | 2− | 4 | 1 |
| 51 | A'-17 | 2− | 3+ | 1 |

Examples 52 and 53

Test cloths were obtained in the same manner as in Example 18 except that the DMBuPA concentration was changed as identified in Table 4. The results of evaluation of the test cloths are shown in Table 4.

Examples 54 to 56

Test cloths were obtained in the same manner as in Example 23 except that the DMBuPA concentration was changed as identified in Table 4. The results of evaluation of the test cloths are shown in Table 4.

TABLE 4

| | | Solid content [mass %] | DMBuPA [mass %] | Ultrafine polyester wooly | | | High density nylon taffeta | | |
|---|---|---|---|---|---|---|---|---|---|
| Ex. | Copolymer | | | Oil repellency | Water repellency | Dynamic water repellency | Oil repellency | Water repellency | Dynamic water repellency |
| 25 | A-1 | 0.6 | 0 | 1− | 2+ | 1 | 1− | 3 | 1 |
| 52 | A-1 | 0.6 | 1.0 | 5− | 5 | 4+ | 3− | 5− | 3+ |
| 18 | A-1 | 0.6 | 2.0 | 5 | 5 | 5 | 5 | 5 | 4+ |
| 53 | A-1 | 0.6 | 4.0 | 5 | 5 | 5 | 5 | 5 | 5− |
| 30 | A'-6 | 0.6 | 0 | 0 | 2+ | 1 | 0 | 2+ | 1 |
| 54 | A'-6 | 0.6 | 1.0 | 2 | 4 | 1+ | 1 | 4 | 1+ |
| 23 | A'-6 | 0.6 | 2.0 | 2 | 4+ | 1+ | 1 | 4 | 2 |
| 55 | A'-6 | 0.6 | 4.0 | 4 | 5 | 3 | 4− | 5− | 2 |
| 56 | A'-6 | 0.6 | 8.0 | 5− | 5 | 3+ | 4 | 5− | 3 |

Examples 57 to 59

Test cloths were obtained in the same manner as in Example 18 except that DMBuPA was changed to the film-forming assistant as identified in Table 5. The results of evaluation of the test cloths are shown in Table 5.

Examples 60 to 62

Test cloths were obtained in the same manner as in Example 23 except that DMBuPA was changed to the film-forming assistant as identified in Table 5. The results of evaluation of the test cloths are shown in Table 5.

TABLE 5

| Ex. | Copolymer | Solid content mass[%] | Film-forming assistant 2.0 mass % | Ultrafine polyester wooly | | | High density nylon taffeta | | |
|---|---|---|---|---|---|---|---|---|---|
| | | | | Oil repellency | Water repellency | Dynamic water repellency | Oil repellency | Water repellency | Dynamic water repellency |
| 18 | A-1 | 0.6 | DMBuPA | 5 | 5 | 5 | 5 | 5 | 4+ |
| 57 | A-1 | 0.6 | TeEGDME | 5 | 5 | 5 | 5 | 5 | 4 |
| 58 | A-1 | 0.6 | EGDME | 2− | 3− | 1 | 2− | 3+ | 1 |
| 59 | A-1 | 0.6 | DEGDME | 2− | 3 | 2 | 2− | 3+ | 1 |
| 23 | A'-6 | 0.6 | DMBuPA | 2 | 4+ | 1+ | 1 | 4 | 2 |
| 60 | A'-6 | 0.6 | TeEGDME | 3− | 4 | 2 | 2 | 4 | 3− |
| 61 | A'-6 | 0.6 | EGDME | 2− | 3− | 1+ | 1− | 2+ | 1 |
| 62 | A'-6 | 0.6 | DEGDME | 2− | 3+ | 2− | 2− | 3 | 1 |

Examples 63 to 65

Test cloths were obtained in the same manner as in Example 18 except that DMBuPA was changed to the film-forming assistant as identified in Table 6. The results of evaluation of the test cloths are shown in Table 6.

TABLE 6

| Ex. | Copolymer | Solid content mass[%] | Film-forming assistant 2.0 mass % | Ultrafine polyester wooly | | | High density nylon taffeta | | |
|---|---|---|---|---|---|---|---|---|---|
| | | | | Oil repellency | Water repellency | Dynamic water repellency | Oil repellency | Water repellency | Dynamic water repellency |
| 18 | A-1 | 0.6 | DMBuPA | 5 | 5 | 5 | 5 | 5 | 4+ |
| 63 | A-1 | 0.6 | DPG | 5− | 4+ | 3 | 2− | 4 | 1 |
| 64 | A-1 | 0.6 | TrPG | 4 | 4 | 2+ | 2 | 4 | 1+ |
| 65 | A-1 | 0.6 | DPGMME | 5 | 4+ | 3+ | 1− | 4+ | 1 |

INDUSTRIAL APPLICABILITY

The water/oil repellent composition of the present invention is useful to applications to impart water/oil repellency to e.g. fiber products (clothing (sports wears, coats, jumpers, work clothes, uniforms, etc.), bags, industrial materials, etc.), nonwoven fabrics, leather products, stone materials, concrete building materials, etc. Further, it is useful as a repairing agent for e.g. products having wearing performance deteriorated. Further, it is useful as a coating agent for filtration material or as a surface protective agent. Further, it is useful also for an application wherein it is mixed with e.g. polypropylene or nylon, followed by molding or forming into fibers to impart water/oil repellency.

This application is a continuation of PCT Application No. PCT/JP2012/060625, filed on Apr. 19, 2012, which is based upon and claims the benefit of priorities from Japanese Patent Applications 2011-099960 filed on Apr. 27, 2011 and Japanese Patent Application No. 2011-269960 filed on Dec. 9, 2011. The contents of those applications are incorporated herein by reference in its entirety.

What is claimed is:

1. A method for treating an article, which comprises steps 1 and 2:

Step 1: a step of preparing a water/oil repellent composition comprising a copolymer (A) and an aqueous medium (B), wherein the aqueous medium (B) contains water and at least one film-forming assistant selected from a film-forming assistant (x) and a film-forming assistant (y) wherein (y) has a boiling point of at least 250° C., and Step 2: a step of treating an article with the water/oil repellent composition prepared in Step 1 wherein the copolymer (A) has structural units based on the following monomer (a), structural units based on the following monomer (b), and at least one type of structural units selected from structural units based on the following monomer (c) and structural units based on the following monomer (d), wherein monomer (a) is a compound represented by the following formula (1):

$$(Z-Y)_n X \quad (1)$$

wherein Z is a $C_{1-6}$ polyfluoroalkyl group or a group represented by the following formula (2), Y is a bivalent organic group having no fluorine atom, or a single bond, n is 1 or 2, and X is, when n is 1, any one of the groups represented by the following formulae (3-1) to (3-5) and, when n is 2, any one of the groups represented by the following formulae (4-1) to (4-4):

$$C_i F_{2i+1} O(CFX^1 CF_2 O)_j CFX^2- \quad (2)$$

wherein i is an integer of from 1 to 6, j is an integer of from 0 to 10, and each of $X^1$ and $X^2$ is a fluorine atom or a trifluoromethyl group;

$$-CR=CH_2 \quad (3-1)$$

$$-C(O)OCR=CH_2 \quad (3-2)$$

$$-OC(O)CR=CH_2 \quad (3-3)$$

$$-OCH_2-\phi-CR=CH_2 \quad (3-4)$$

$$-OCH=CH_2 \quad (3-5)$$

wherein R is a hydrogen atom, a methyl group or a halogen atom, and φ is a phenylene group;

$$-CH[-(CH_2)_m CR=CH_2]- \quad (4-1)$$

$$-CH[-(CH_2)_m C(O)OCR=CH_2]- \quad (4-2)$$

—CH[—(CH$_2$)$_m$OC(O)CR=CH$_2$]— (4-3)

—OC(O)CH=CHC(O)O— (4-4)

where R is a hydrogen atom, a methyl group or a halogen atom, and m is an integer of from 0 to 4;

monomer (b) is vinylidene chloride;

monomer (c) is a monomer having no polyfluoroalkyl group nor crosslinkable functional group, the homopolymer of which has a glass transition temperature of at least 20° C.; and monomer (d) is a monomer having no polyfluoroalkyl group and having a crosslinkable functional group;

wherein the film-forming assistant (x) is a compound represented by the following formula (5):

R$^1$O(CH$_2$)$_r$(CHR$^4$)$_s$C(O)NR$^2$R$^3$ (5)

wherein r is an integer of from 0 to 3, s is 0 or 1,

R$^1$ is a C$_{1-4}$ alkyl group, each of R$^2$ and R$^3$ which are independent of each other, is a C$_{1-3}$ alkyl group (provided that it may contain an etheric oxygen atom), and R$^4$ is a hydrogen atom or a methyl group;

and wherein the film-forming assistant (y) is a compound represented by the following formula (6):

R$^5$—O—(CH$_2$CH$_2$O)$_t$—R$^6$ (6)

wherein t is 3 or 4, each of R$^5$ and R$^6$ which are independent of each other, is a C$_{1-4}$ alkyl group.

2. The method of claim 1, wherein a total amount of the film-forming assistant (x) and the film forming assistant (y) is from 10 to 4,000 parts by mass per 100 parts by mass of copolymer (A).

3. The method of claim 1, wherein a total amount of the film-forming assistant (x) and the film forming assistant (y) to the copolymer (A) is from 50 to 2,000 parts by mass per 100 parts by mass of copolymer (A).

4. The method of claim 1, wherein a total amount of the film-forming assistant (x) and the film forming assistant (y) is from 300 to 1,000 parts by mass per 100 parts by mass of copolymer (A).

5. The method of claim 1, wherein the article is selected from the group consisting of fibers, various fiber products, a nonwoven fabric, a resin, paper, leather, a metal, a stone, concrete, gypsum and glass.

6. The method of claim 1, wherein the film-forming assistant (x) is 3-alkoxy-N,N-dialkylpropionamide.

7. The method of claim 1, wherein the film-forming assistant (y) is tetraethylene glycol dimethyl ether.

8. The method of claim 1, wherein a water/oil repellant property is imparted to the article.

* * * * *